United States Patent [19]

Soroushian et al.

[11] Patent Number: 5,489,333
[45] Date of Patent: Feb. 6, 1996

[54] SHRINKAGE COMPENSATING CONCRETE WITH EXPANSIVE ADDITIVE

[75] Inventors: Parviz Soroushian; Augustine C. Okwuegbu, both of East Lansing, Mich.

[73] Assignee: Board of Trustees operating Michigan State University, East Lansing, Mich.

[21] Appl. No.: 401,308

[22] Filed: Mar. 9, 1995

Related U.S. Application Data

[63] Continuation of Ser. No. 142,610, Oct. 25, 1993, abandoned.
[51] Int. Cl.$^6$ .................................... C04B 18/04
[52] U.S. Cl. ..................... 106/697; 106/644; 106/713; 106/724; 106/816; 106/819; 106/820; 588/252; 588/255; 588/901
[58] Field of Search ............................ 106/643, 644, 106/697, 711, 724, 713, 737, 738, 816, 819, 820; 588/252, 255, 901

[56] References Cited

U.S. PATENT DOCUMENTS

| | | | |
|---|---|---|---|
| 4,588,443 | 5/1986 | Bache | 106/644 |
| 4,590,726 | 5/1986 | Salazar | 106/712 |
| 4,750,274 | 6/1988 | Erdman, Jr. et al. | 34/39 |
| 4,762,563 | 8/1988 | Colin | 106/712 |
| 4,980,030 | 12/1990 | Johnson et al. | 34/32 |
| 5,199,986 | 4/1993 | Krökert et al. | 106/712 |

FOREIGN PATENT DOCUMENTS

| | | |
|---|---|---|
| 130629 | 10/1979 | Japan. |
| 60-033276 | 2/1985 | Japan. |

OTHER PUBLICATIONS

Hanks "Haden Environmental's Dry Pure System", Environmental Information, Ltd., pp. 13–17, 1992.
Neville, A. M., Properties of Concrete, Longman Scientific and Tech. 85 . 87 (1991) (no month).
Mindess, S. and Young, J. F., "Concrete", Prentice–Hall, Inc., Englewood Cliffs, N.J., pp. 38–45 (1981) (no month).
Mehta, P. K., Concrete Structure, Properties, and Materials, 6, 206–207 (1986) (no month).
McCarthy, G. J., et al., "Mineralogical Analysis of Advanced Coal Conversion Residuals by X–Ray Diffraction" Proceedings, Tenth Ash Use Symposium Report EPRS TN–101779, Electric Power Res. Institute, pp. 58–1–58.14 (1993) (no month).
Hazard Communication Sheets 69561.

*Primary Examiner*—Mark L. Bell
*Assistant Examiner*—Michael Marcheschi
*Attorney, Agent, or Firm*—Ian C. McLeod

[57] ABSTRACT

An expansive Portland cement incorporating an expansive additive which is a polymer incorporating a calcium compound reactive with the cement is described. The shrinkage compensating concrete produced is much less likely to crack and is used in slabs and other structural systems where cracking of the concrete is a problem.

17 Claims, 18 Drawing Sheets

SHRINKAGE COMPENSATING CONCRETE WITH EXPANSIVE ADDITIVE

This is a continuation of application Ser. No. 08/142,610 filed on Oct. 25, 1993 now abandoned.

BACKGROUND OF THE INVENTION

1. Field of the Invention

The present invention relates to the use of a polymer containing one or more calcium compounds in the polymer matrix, particularly paint sludge powders, which are admixed in Portland cement as reactive expansive additives in providing shrinkage compensating concrete. In particular, the present invention relates to rod reinforced shrinkage compensating concrete containing the expansive additive.

2. Description of Related Art

Shrinkage compensating concrete has found particular application in parking structures and other buildings, pavements, bridge deck overlays, patching of pavements (potholes), and water storage tanks to control cracking caused by shrinkage movements in concrete structures. If inexpensive expansive additives could be found, then the usage would be more widespread. The present market for expansive additives for use in concrete is several thousand tons per year. Expansive additives for use in concrete are currently sold at prices of several hundred dollars per ton.

One of the major disadvantages of Portland cement concrete is its susceptibility to tensile cracking when volume contractions associated with drying shrinkage are wholly or partially restrained as discussed in "Properties of Concrete" by A. M. Neville, Longman Scientific and Technical (1991). Shrinkage cracking is unsightly and destroys the integrity of concrete. Special costly allowances must be made in design and construction of concrete pavements and other structures in order to reduce the restraint against shrinkage movements.

Volume expansions during moist curing in ordinary Portland cements are very small. If greater expansions could be reached during hardening (e.g., through the use of expansive additives), the effects of contractions that occur upon drying could be offset. The development of expansive additives for the production of "shrinkage compensating concrete" dates back about 50 years. Commercial production began in the United States in the 1960's, and current consumption is about 500,000 tons annually (Mindess, S. and Young, J. F., "Concrete" Prentice-Hall, Inc., Englewood Cliffs, N.J., pp. 38–45 (1981)).

All the variants of present day expansive additives are based on the formation of ettringite (calcium sulfoaluminate hydrate) in considerable quantities during the first few days of curing. Mehta (Mehta, P. K., Concrete, Structure, Properties, and Materials 6, pp 206–207 (1986)) suggests that the ettringite is able to attract a large number of water molecules which cause interparticle repulsion, thus producing an overall expansion of the system. Proprietary expansive admixtures are also commercially available which confer expansive characteristics in curing concrete. Thus, expansive admixtures are assuming increasingly important roles in the production of shrinkage-compensating concrete.

In field applications of shrinkage compensating concrete, the potential expansion produced by ettringite formation is controlled by the use of ordinary steel reinforcement. Steel restrains the overall bulk expansion of the concrete, thereby converting expansion into a slight prestress within concrete. To resist expansive forces, steel is placed in tension in the concrete and concrete into compression. About 25 to 100 psi (170 to 700 kpa) of compressive stress is generated, which is generally sufficient to ensure that drying will not cause tensile cracking. The concrete either remains in compression or develops relatively small tensile stresses. The exact prestress will depend on total expansion and the amount of reinforcement. Some restraint of expansion may also occur through subgrade friction in slabs or formwork.

Prestress is developed only in the direction and the vicinity of the reinforcing steel. Thus, correct positioning of the steel is important to provide correct restraint, and misplaced reinforcement could lead to lack of adequate prestress or complications such as warping due to differential expansions. These are design considerations.

Expansive additives have been used in a wide variety of concrete structures. One of the more frequent uses in the United States has been in parking structures, to prevent water leaks that can cause damage to cars. The largest such structure is the parking building at O'Hare International Airport in Chicago, which used 120,000 yd$^3$ (90,000 m$^3$) of shrinkage-compensating concrete. In concrete pavements using expansive additives, the shrinkage control joints can be combined with thermal expansion control joints and other construction joints. The elimination of shrinkage control joints is an attractive advantage in the laying of pavements. The largest paving job to date using the expansive additives is probably at the Love Field Airport at Dallas-Fort Worth, where more than 150,000 yd$^3$ (1,150,000 m$^3$) of shrinkage-compensating concrete was used in taxiways. Use of shrinkage-compensating concrete in bridge deck overlays helps to minimize cracking and control the corrosion of steel in bridge decks. In patching of concrete pavements, where shrinkage can cause separation, shrinkage compensating concrete has found widespread application. Expansive concrete can also be used in structures where water-tightness is an important requirement, such as water storage tanks, swimming pools and ice rinks. Shrinkage-compensating concrete has also been used in tilt-up construction, where residual prestress helps elements withstand the stresses imposed during lifting, and the separation between elements is minimized.

A process for producing dry powders from overspray in painting of various products, particularly vehicles, is described in Environmental Information 13 to 17 (May 1992). This publication suggests uses for the powder in cement blocks on roofing mastics essentially as a filler. There was no suggestion that such paint powders could be used for an expansive concrete. The drying process for the powder includes a heated screw conveyor which dries the powder. Volatile organic compounds are removed from the dried paint along with water during the drying.

Numerous polymer compositions have been suggested for use in concrete as fillers. Such uses of polymers are taught by Japanese Patent No. 60033276 (Abstract; 1985), for instance where foamed styrene is used for paver stones. Numerous other patents describe polymer powders used as fillers. These polymers are essentially insert and do not cause the concrete to expand.

OBJECTS

It is an object of the present invention to provide new shrinkage compensating concretes incorporating an expansive admixture.

It is further an object of the present invention to provide methods and compositions for use in concrete. Further, it is an object of the present invention to provide an economical method and compositions for producing an expansive concrete. These and other objects will become increasingly apparent by reference to the following description and the drawings.

DESCRIPTION OF PREFERRED EMBODIMENTS

Figure 1:
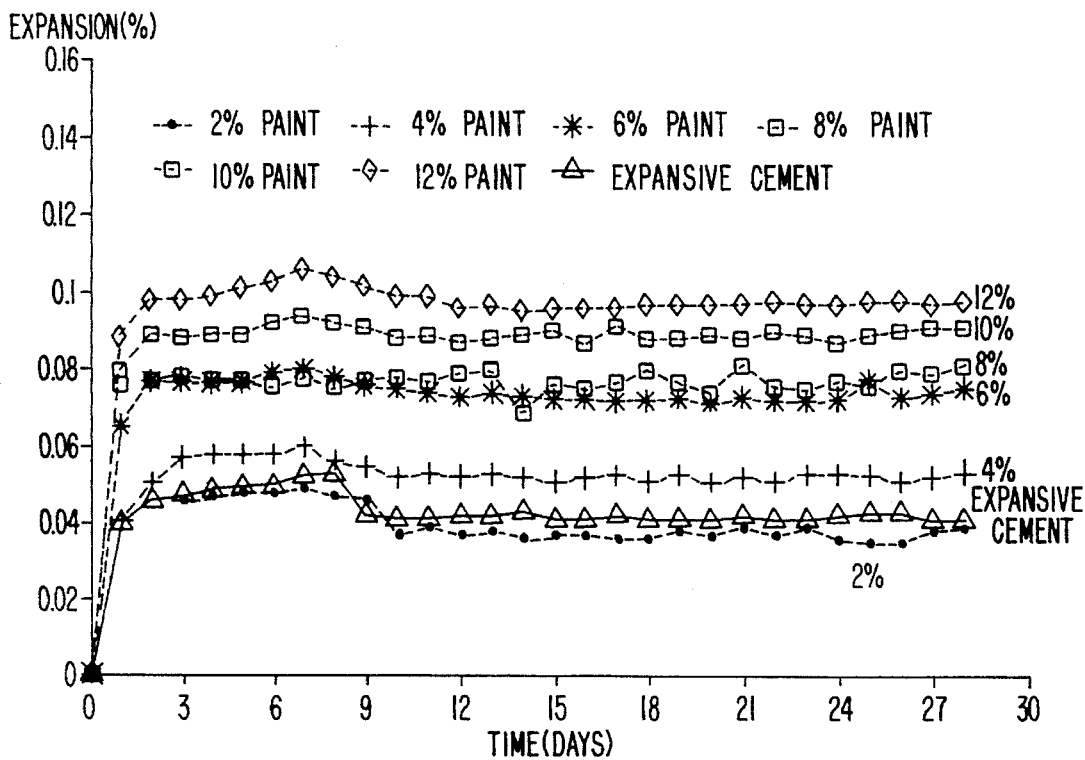
FIG. 1 is a graph showing the percentage expansion of a Portland cement based concrete as a function of various percentages by weight of a solvent based paint (Pittsburgh Plate Glass (PPG), Pittsburg, Pa.), powder produced from an automotive plant to the cement and then curing.
Figure 2:
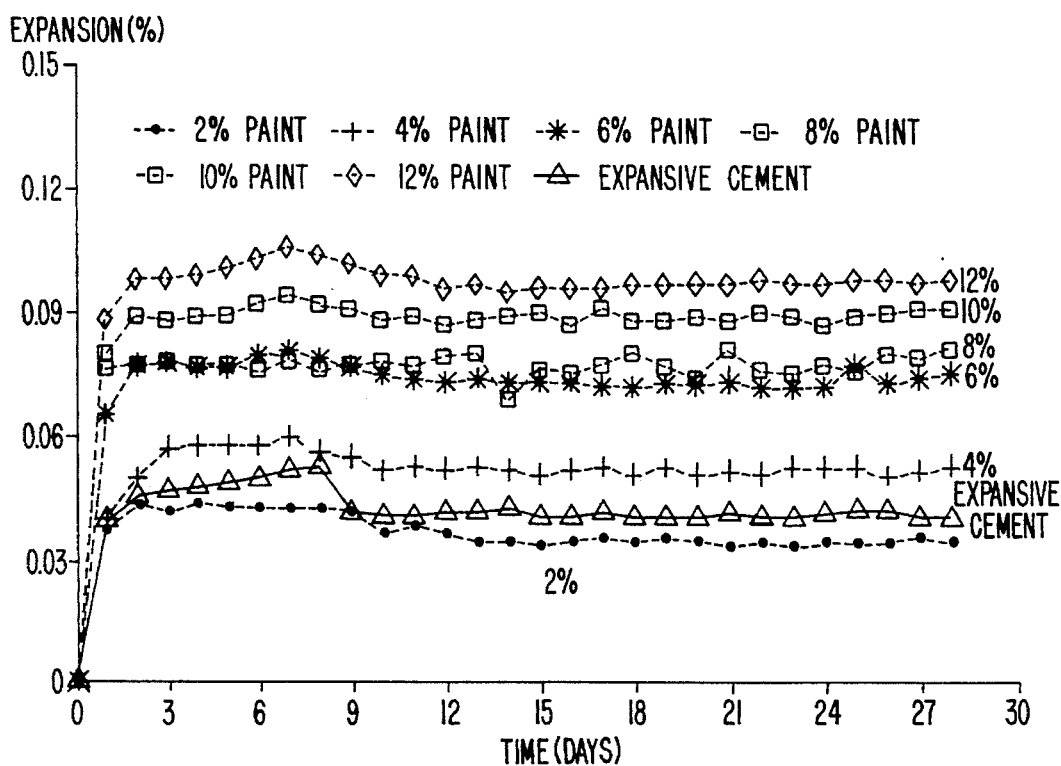
FIG. 2 is a graph showing the use of another solvent based paint (BASF, Charlotte, N.C.) powder in the system of FIG. 1.
Figure 3:
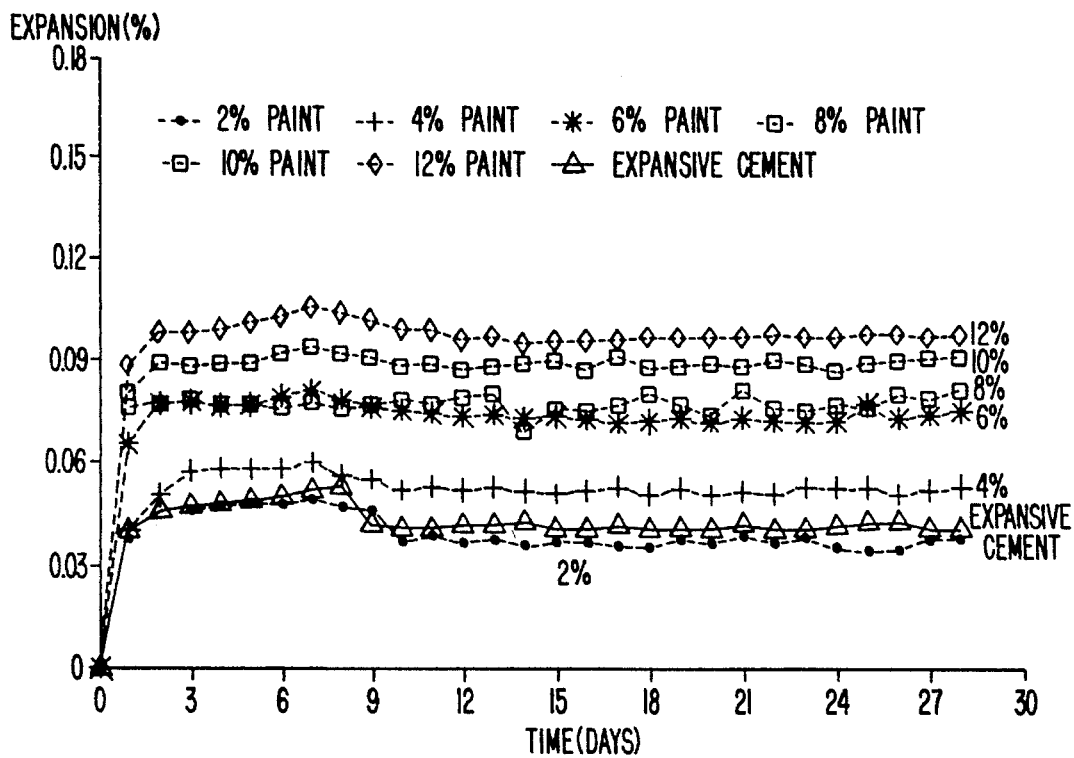
FIG. 3 is a graph showing the use of a water based paint (PPG) powder in the system of FIG. 1.
Figure 4:
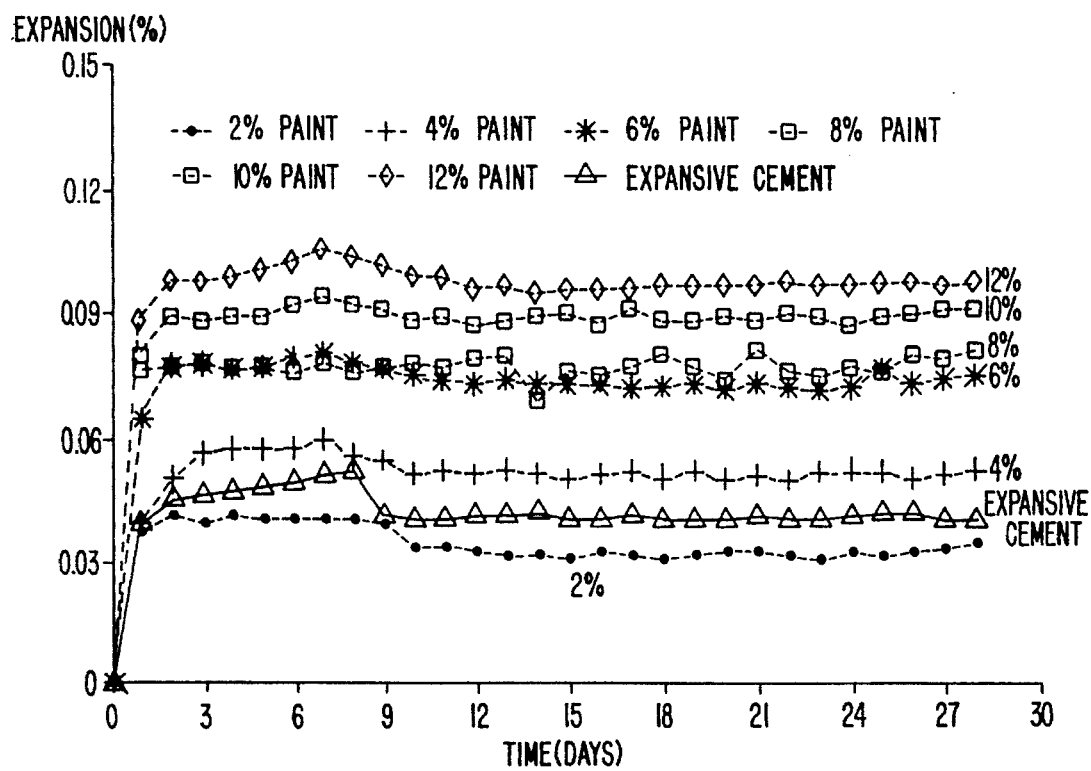
FIG. 4 is a graph showing the use of a solvent and water based paint (PPG) powder in the system of FIG. 1.
Figure 5:
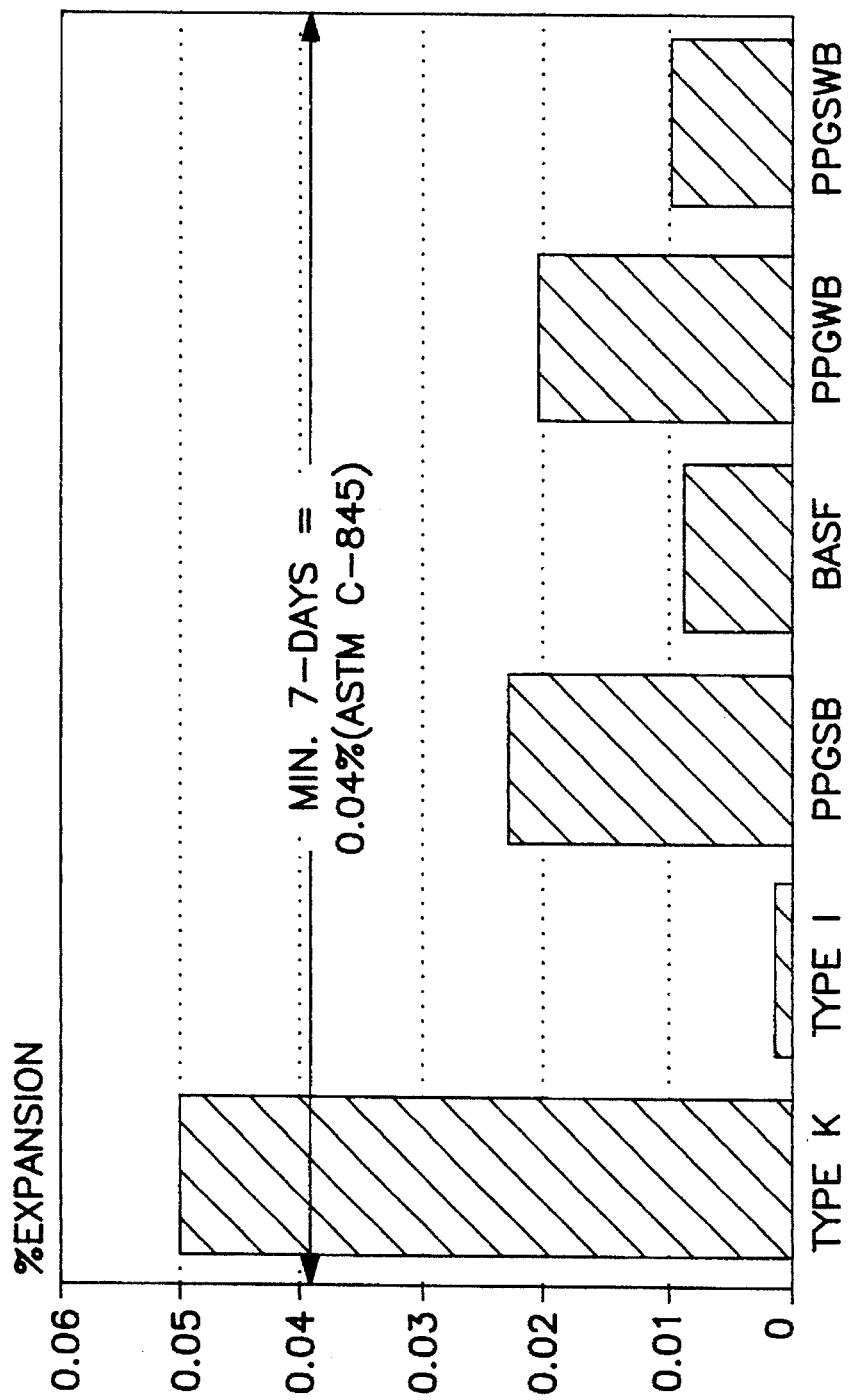
FIG. 5 is a graph showing a 7-day restrained expansion test of a Portland cement mortar results (0.5% powder, cement ratio) for the various powders of FIGS. 1 to 4 as a function of percent expansion (ASTM C-845). SB is solvent based, SWB water and solvent and WB is water based.
Figure 6:
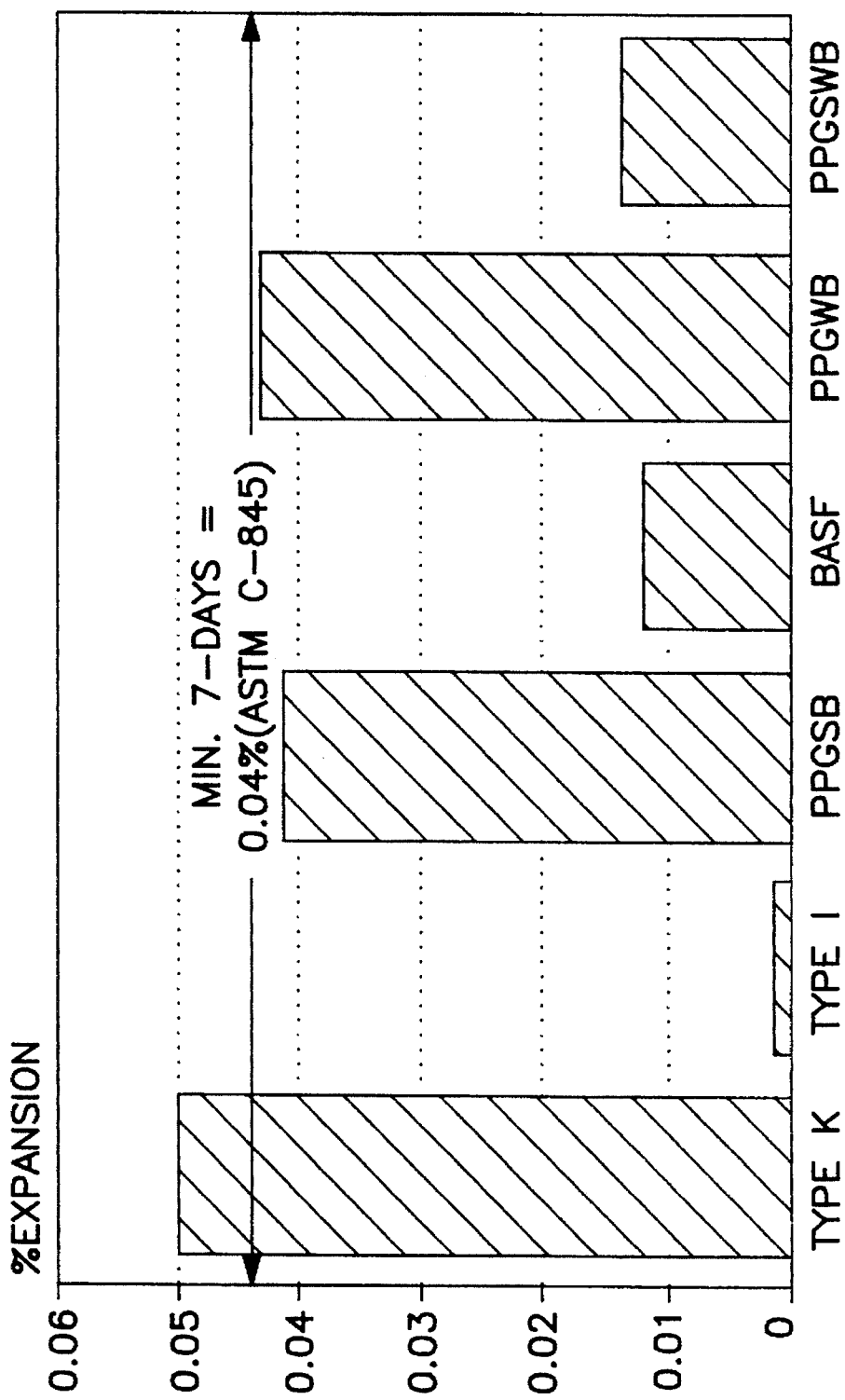
FIG. 6 is a graph showing a restrained expansion test of a Portland cement (1 percent powder) as in FIG. 5.
Figure 7:
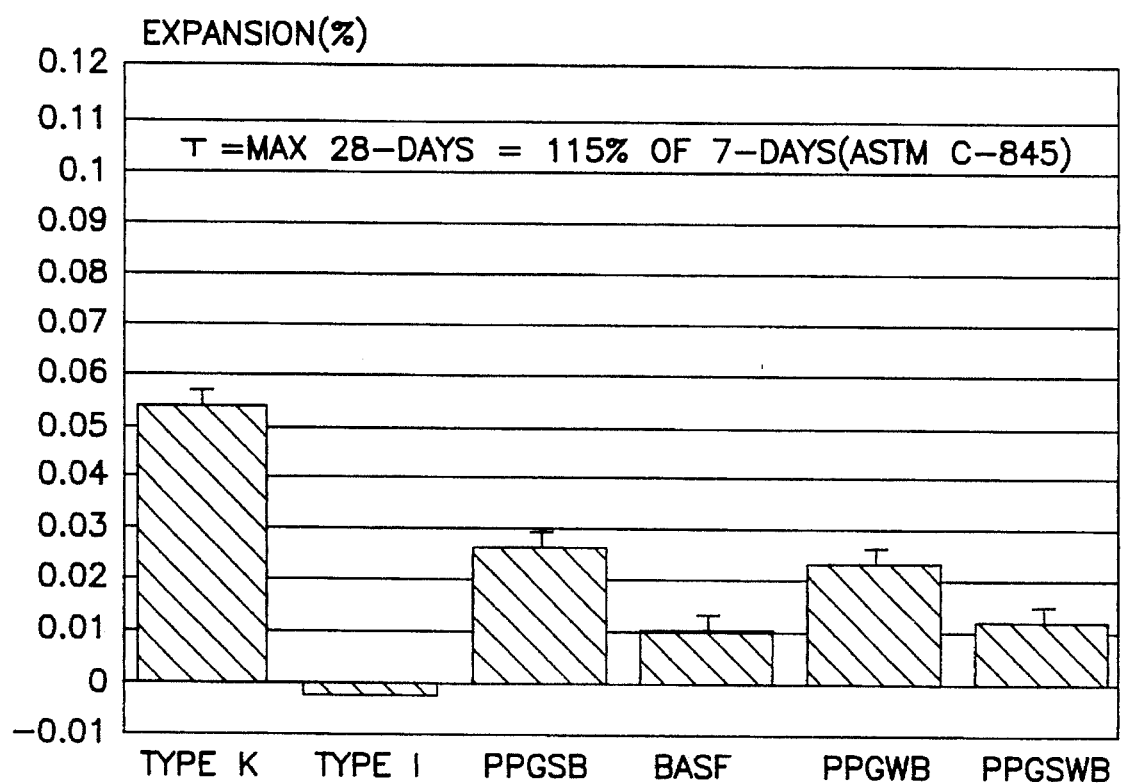
FIG. 7 is a graph showing a 28 day restrained expansion test (0.5% powder) as in FIG. 5.
Figure 8:
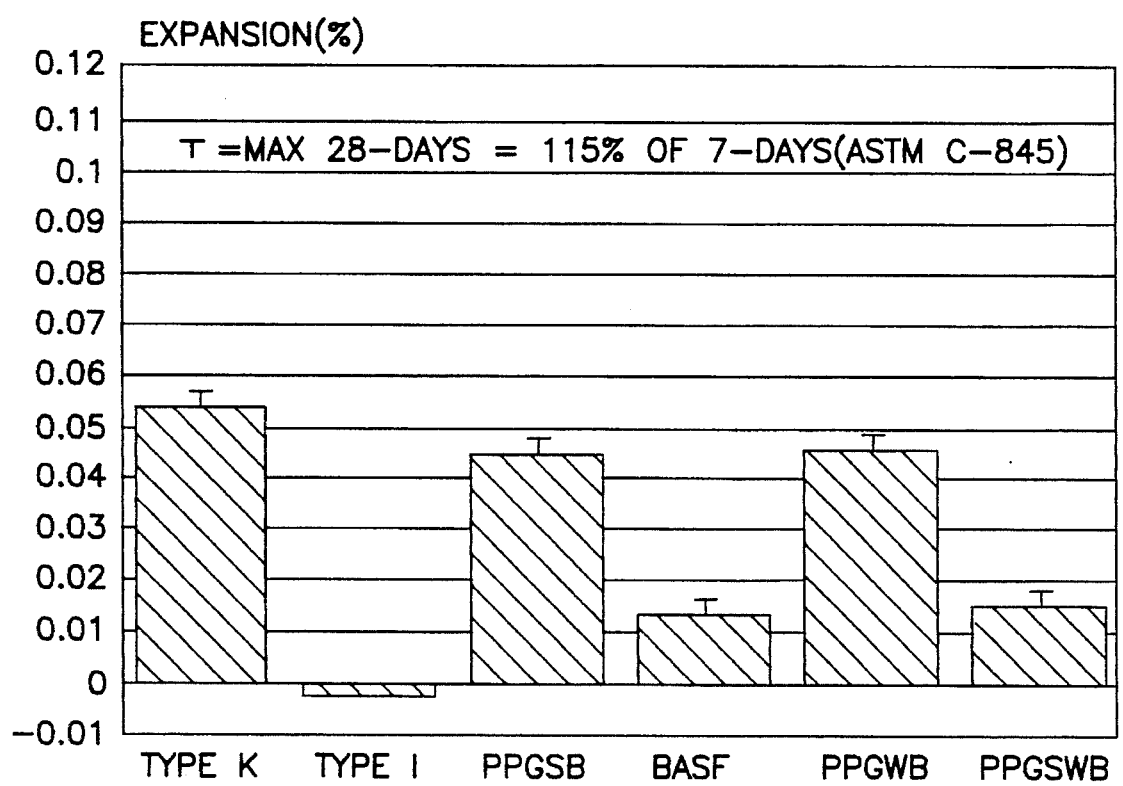
FIG. 8 is a graph showing a 28 day restrained expansion test (1% powder) as in FIG. 6.
Figure 9:
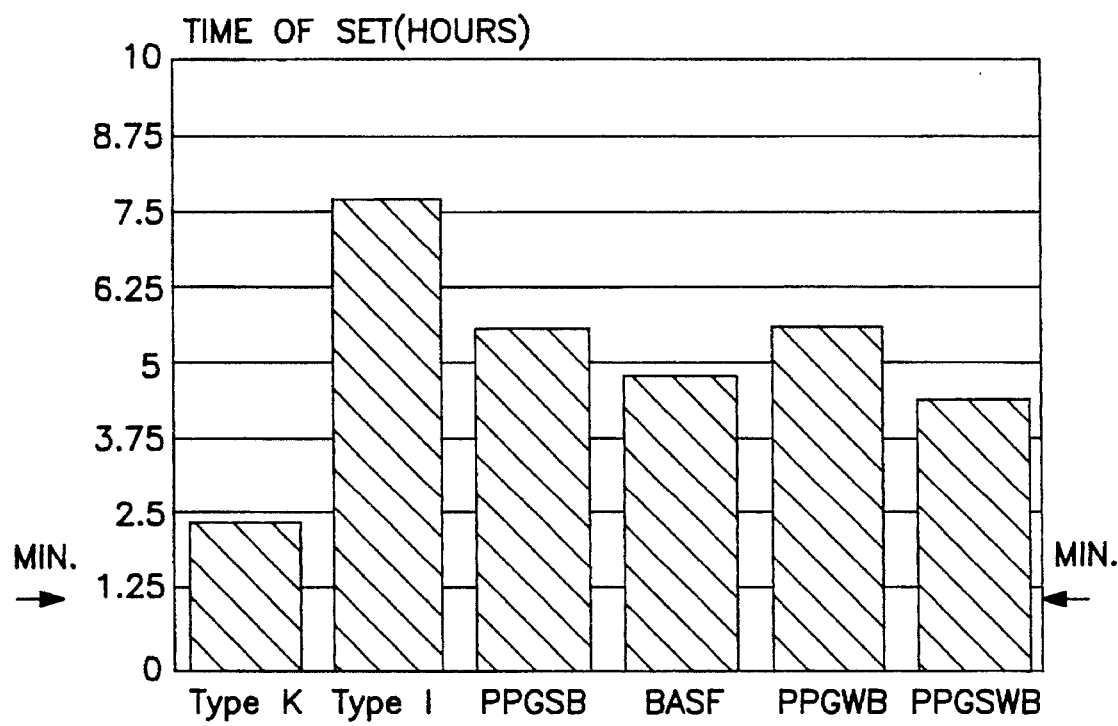
FIG. 9 is a graph showing the results of a final time of set test (0.5 powder).
Figure 10:
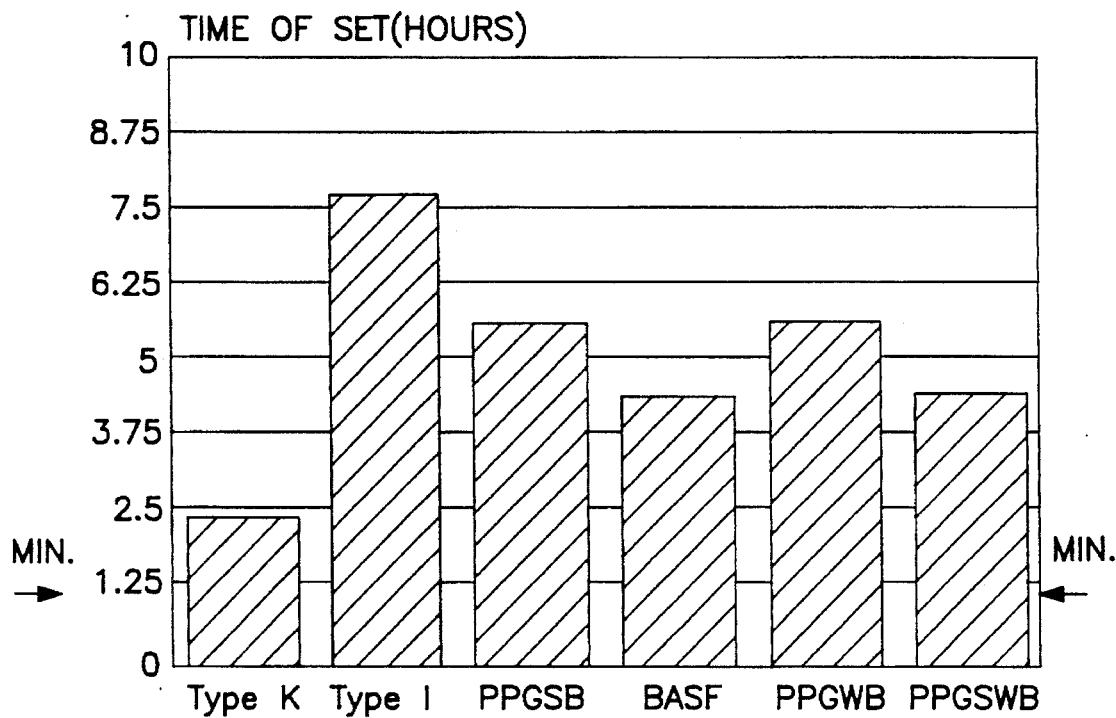
FIG. 10 is a graph showing the results of a final time of set test (1% powder).
Figure 11:
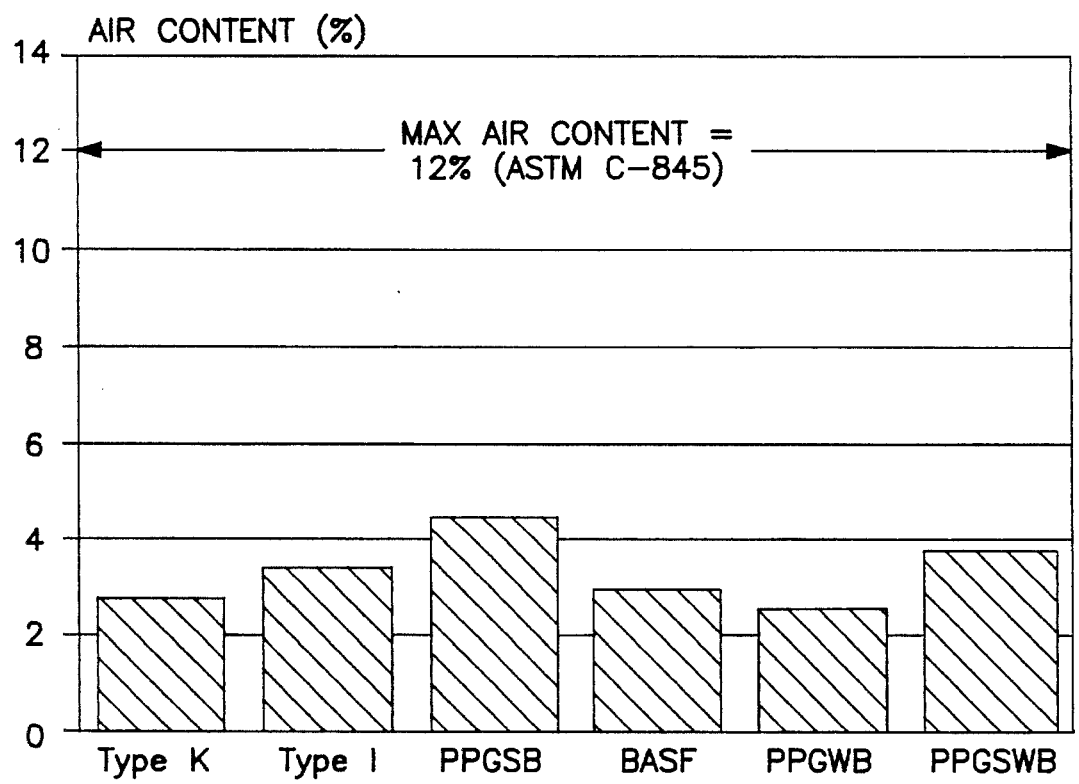
FIG. 11 is a graph showing the results of an air content test (0.5 powder).
Figure 12:
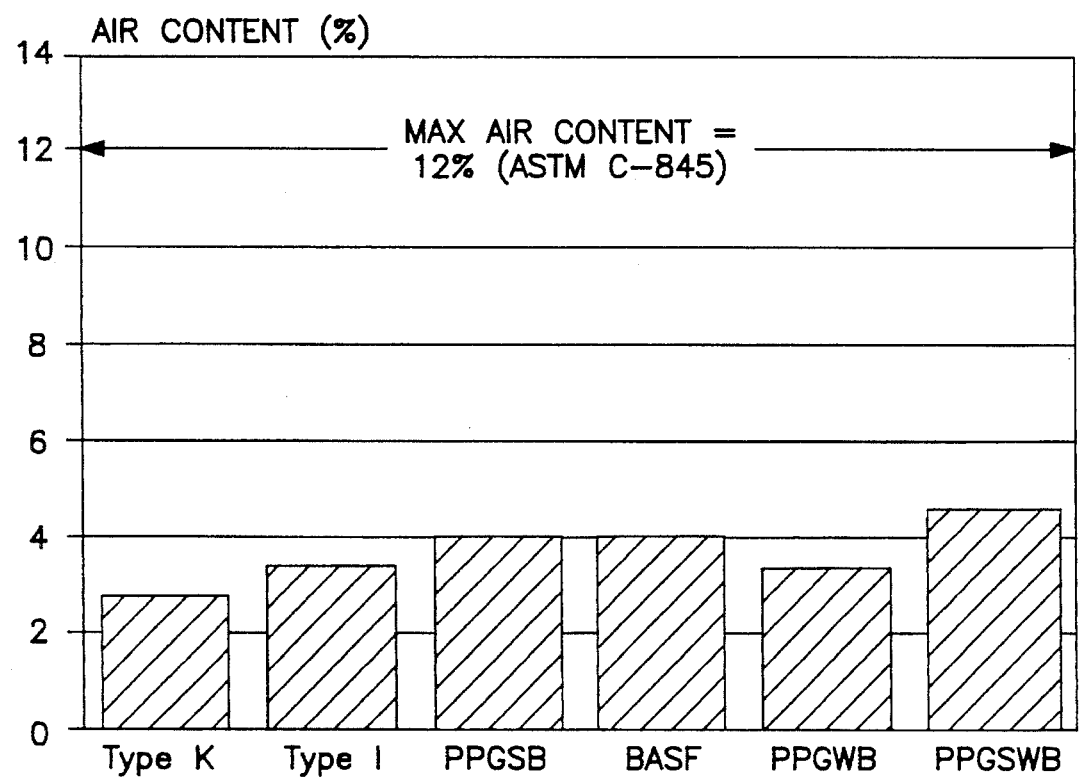
FIG. 12 is a graph showing the results of an air content test (1% powder).

The present invention relates to a composition which hardens to form an expansive concrete when combined with water which comprises an admixture: a powder of a Portland cement; dried paint polymer powder particles having a particle size between about 74 and 850 micrometers containing between about 0.001 and 1 parts by weight of an inorganic calcium material encapsulated in the particles which reacts with the cement combined with the water to cause the concrete to expand, wherein the particles are dispersed in the cement in an amount between about 0.5 and 5 percent by weight of the cement.

Further, the present invention relates to a reinforced expansive concrete which comprises: a hardened Portland cement with reinforcing rods embedded in the hardened cement wherein the cement contains paint powder particles dispersed in the cement contain between about 0.001 and 1 parts by weight of an inorganic calcium material encapsulated in the paint particles which reacts with the cement combined with water to cause the concrete to expand, wherein the particles are dispersed in the cement in an amount between about 0.5 and 5 percent by weight of the cement.

Further still, the present invention relates to an improvement in a method for preparing a reinforced expansive concrete by pouring a Portland cement composition around reinforcing rods for the cement which comprises: providing in the composition with water an effective amount of dried paint polymer powder particles which allows expansion of the concrete after hardening and containing an inorganic calcium material which reacts with the cement composition to cause the concrete to expand as a fluid concrete; and pouring the fluid concrete containing the particles over the reinforcing rods inside a form for the concrete; and allowing the fluid concrete to harden under moist conditions for at least seven days in the form to form a partially cured concrete that has expanded during the seven days; and allowing the concrete to expand over a period of time to form the reinforced expansive concrete so that restraint of expansion by the reinforcing rod produces compression stresses in the expansive concrete which resist cracking of the concrete.

Finally, the present invention relates to an improvement in a method for preparing an expansive concrete by pouring a Portland cement composition such that expansion of the concrete is restrained, which comprises: providing in the composition with water an effective amount which allows expansion of the concrete after hardening of dried paint polymer powder particles containing an inorganic calcium material which reacts with the cement combined with the water to cause the concrete to expand to provide a fluid concrete; and pouring the fluid concrete containing the particles inside a form for the concrete such that expansion of the concrete is restrained; and allowing the fluid concrete to harden under moist conditions with the restraint for up to seven days in the form to produce a partially cured concrete that has expanded; and allowing the concrete to develop compression stresses through the restraint of expansion of the concrete which resist cracking of the concrete.

The cement used is Portland cement. This material is a hydraulic binder which hardens at ambient temperature and in the presence of moisture through the formation of hydrates of calcium silicate, calcium aluminosulfate, etc. The solution of Portland cement and the pore water in hardened cement paste are highly alkaline. The cement paste is generally used as binders in conjunction with aggregates of different size to produce mortar or concrete. Cement paste, mortar and concrete (referred to as concrete from here on) are all contemplated as being within the scope of the present invention.

The concrete is generally reinforced or at least restrained by a supporting surface during curing. Typically metal rods are used in the concrete to restrain the expansion of the concrete, usually as an open mesh in a manner well known to those skilled in the art.

The preferred expansion additive is produced from a dried paint sludge powder containing particles from overspray in a production setting. Such sludges are composed of polymers and incorporate various calcium compounds as fillers or bulking agents. The powders are collected in water and dried. The drying is at 100° to 400° C. to remove volatile materials, preferably using the screw retort apparatus. The expansion additive can contain water, even other liquids, so long as they do not interfere with the curing of the concrete. Automobile paint consists of pigments, solvent (for spray and flow qualities), resin, filler (e.g. titanium dioxide), and small amounts of other ingredients (e.g. plasticizers). The solvent will not be present after the paint hardens. The resins used are preferably acrylics and melamine; the resin binds the pigment particles together, and gives the film properties (e.g. corrosion resistance). The resin (acrylics, melamine) appears in the powder. Drying causes cross-linking of the resin which is present in the paint at lower molecular weights. Melamine formaldehyde is present in very small quantities both in the paint and in the chemicals added during the drying process. The automobile paints generally require heat curing. Calcium carbonate is part of the material placed on the grating in the spray booth in order to facilitate cleaning and ends up in the powder. The compositions of the dried paints is set forth in Hazard Communication Sheets 69561.

The paint sludge powder has unexpectedly been found to act as an expansive admixture in conventional Portland cement concrete mixtures. The expansion properties of Portland cement mortars incorporating the paint sludge powder are comparable to those obtained with the prior art expansive additives.

The test results indicate that desirable expansion properties can be obtained at an amount of a paint sludge powder-to-cement of about 5% by weight although for most applications 1 to 2% by weight is preferred. Larger amounts cause the concrete to crack at the surface.

A number of issues were resolved in order to confirm suitability of paint sludge powder for the production of shrinkage compensating concrete. Expansions caused by the paint sludge powder should only contribute to the development of prestress in restrained Portland cement concrete when they are generated after the concrete has gained rigidity through the hydration of cement. Any expansion produced while the concrete is still plastic is of little value. Temperature and humidity generally play important roles in deciding the rates of expansion and hydration of the concrete; the physical and chemical properties of Portland cement and mix proportions are other factors with potentially significant effects on the balance between the expansion and hydration rates. An interference of paint sludge powder with the hydration process of cement could have influenced the setting time and thus the water requirements and processing procedures of Portland cement concrete. It was confirmed that the paint sludge powder did not adversely influence the resistance of concrete to chemical and physical causes of deterioration, particularly to sulfate attack. The environmental impacts of using the paint sludge powder in concrete were found not to be a problem.

In producing the expansive concrete:

(1) Paint sludge powders obtained from different paint systems were screened and selected for use in concrete as expansive admixtures.

(2) The chemical and physical characteristics of the selected paint sludge powders were determined and the variations in properties with time were assessed.

(3) The rates of hydration and expansion in Portland cement concretes incorporating different paint sludge powders were assessed, considering broad ranges of proportioning, processing and curing variables and the expansion mechanisms were established.

(4) The environmental impacts of using different paint sludge powders in concrete were determined.

(5) The competitive prices for the paint sludge powders were determined.

Paint sludge powders were selected for use in concrete as expansive admixtures. Four types of sludge powder were evaluated:

(1) BASF (Charlotte, N.C.) Solvent-Based (2) PPG (Pittsburg, Pa.) Water-Solvent Mixture Based (3) PPG Water-Based (4) PPG Solvent-Based Some key aspects of the physical and chemical characteristics of these paint sludge powders were investigated following the ASTM C-311 test procedures. Effects of the addition of different dosages of these powders to conventional concrete mixtures on the following aspects of the material properties were investigated:

Slump (ASTM C-143)

Air Content (ASTM C-231)

Free Dimensional Movements (ASTM C-426)

Compressive Strength (ASTM C-39)

Modulus of Elasticity (ASTM C-469)

Test results on the physical and chemical characteristics of different paint sludge powders together with the observed effects of different powders on the fresh and hardened concrete material properties provided the basis for the selection of two paint systems the sludge powders of which present the best method for providing expansive effects in concrete without negatively influencing other short and long term engineering properties of the material.

Inductively coupled plasma-atomic emission spectroscopy techniques together with the ASTM C-311 test procedures were used to produce comprehensive information on the chemical constituents and physical properties of the paint sludge powders obtained from the two selected paint systems. Variations in the physical and chemical properties of the paint sludge powders within and between shipments were determined.

The effects of the paint sludge powders on the hydration process were assessed and the structure of hardened cement paste was investigated. The key variables are:

Sludge powder type

Sludge powder-to-cement ratio

Fineness and chemical properties of Portland cement

Water-cement ratio

Aggregate content

Dosage of air-entraining

Control mixtures incorporating conventional (Type K) expansive cement were investigated.

The effects of the above variables on the following properties of Portland cement concrete were investigated:

Slump

Setting Time (ASTM C-403)

Air Content (ASTM C-231)

Unit Weights (ASTM C-29, C-138, Fresh Mix)

Restrained Expansion (ASTM C-878)
Compressive Strength Development With Time (ASTM C-39)
Modulus of Elasticity (ASTM C-469)
Flexural Strength (ASTM C-78)

A statistical (fractional factorial) design of experiments was conducted using randomization and blocking concepts with sufficient replications of tests in order to derive sound conclusions, based on statistical analysis of test results, accounting for random experimental errors and variability of the paint sludge powder characteristics. Factorial analyses of variance provided information on the trends in the effects of different variables on the rates of hydration and expansion in the material.

Test data was generated in order to decide the paint sludge powder-to-cement ratios which produce a desirable balance between the rates of expansion and cement hydration for different mix proportioning and processing variables, sludge powder characteristics, and cement properties.

A resilient type of restraint, such as that provided by internal reinforcement, was provided to develop shrinkage compensation. Established engineering design practices normally provided sufficient amount of steel. In some non-load-bearing members, slabs on grade, and lightly-reinforced structural members, however, the usual amount of steel may be less than the minimum amount necessary for shrinkage compensating concrete. For such designs, a minimum ratio of reinforcement area is specified. The positioning of this reinforcement is also important in order to provide a uniform restraint and prevent warping.

When structural design considerations result in a reinforcement ratio greater than the recommended minimum, the level of expansion in structural members needs to be estimated. This expansion should be greater than or at least equal to the anticipated shrinkage in order to provide satisfactory shrinkage compensation.

The solubility and mobility of any contaminants that are possibly present in the powder are limited to satisfy EPA requirement when the powder is used as an expansive admixture in Portland cement concrete. Concrete materials incorporating different sludge powder types, with mix proportions and sludge powder contents within the selected ranges, were tested following the "Toxicity Characteristics Leaching procedure (TCLP)," Federal Register 1986, recommended by EPA (Risk Reduction Engineering Laboratory, 1989). Concrete materials are crushed in this test to pass through a 0.38 in. (9.5 mm) screen; a buffered acidic leaching solution is then added and the sample is agitated for 18 hours. The leaching solution is then filtered for analysis; maximum concentrations of different contaminants in the leached solution are then measured and compared against the EPA limits.

Shrinkage-compensating concretes made with expansive cements generally present desirable resistance to physical and chemical causes of deterioration; there are, however, concerns regarding their sulfate resistance (Mehta, P. K., Cement and Concrete Research, Vol. 3, pp. 1–6 (1973)). Conventional expansive cements produce expansion by the reaction of sulfates with various aluminates; the rate of these reactions and the amount of sulfate provided in the cement determine whether an expansive cement reduces the sulfate resistance of concrete or not.

The durability characteristics of concretes incorporating the paint sludge powder as an expansive admixture under different physical and chemical causes of deterioration (particularly sulfate attack) was determined to be satisfactory. Concrete materials incorporating different paint sludge powder types, with the selected (optimum) ranges of sludge powder content, were prepared and their resistance to the following aging effects were determined:

Sulfate Attack (ASTM D-4130)
Repeated Freeze-thaw Cycles (ASTM C-666)
Deicer Salt Scaling (ASTM C-672)
Water Permeation (AASHTO T-277)
Abrasion (ASTM C-944)
Corrosion of Embedded steel (ASTM D-1674)

The use of two different paint systems provided sufficient data for establishing the mechanisms of the expansive action of the paint sludge powder in concrete, and for deriving correlations between the performance characteristics of shrinkage compensating concretes incorporating the sludge powder and the chemical/physical properties of the powder (which can be related to the paint system characteristics). This information was used to establish the trends in the effects of the paint sludge powder chemical characteristics on the performance of the sludge powder as an expansive admixture. These trends can be used to establish limits on the paint system characteristics beyond which the suitability of sludge powder as a concrete admixture would be questionable.

EXAMPLE 1

The paint sludge powders from four automotive manufacturing plants were tested as expansive admixtures in concrete. The effects of the substitution of cement with the paint sludge powders at 2, 4, 6, 8, 10 and 12 percent by weight of cement in conventional concrete mixtures were investigated. A control expansive cement Type K was also tested. The concrete materials were tested for fresh mix slump and air content, free expansion, and 7-day compressive strength. The expansion test specimens were demolded at 24 hours, and were then moist cured during which the expansions were measured.

The expansion test results are presented in FIGS. 1 through 4. Large powder contents produce excess expansion; some surface cracking was also observed at higher powder contents above about 5% by weight. The powder content by weight of cements should be below the minimum 2% used in this test for achieving the most satisfactory results. The source of the paint sludge did not seem to make a difference.

All of the tested paint sludge powders caused a reduction in the slump of concrete material. Air content, however, was largely independent of the sludge powder content. There was no consistent effect of the paint sludge powder on compressive strength.

EXAMPLE 2

The free expansion test results generated in Example 1 were not technically complete enough to produce the best decision on the selection of the best paints for additional tests. Free expansion tests do not represent actual field condition where expansions take place under restrained conditions.

Therefore, axially restrained expansion tests on mortar specimens (ASTM C-806), which are more representative of actual field conditions, were conducted on all of the four powders of Example 1. Control tests with conventional expansive cement and Type I Portland cement were also performed.

Effects of the substitution of cement with the paint sludge powders at 0.5 and 1 percent by weight of cement in conventional concrete and also in a standard mortar mix were investigated following the ASTM C-878 and ASTM C-806 procedures, respectively.

To make the necessary comparisons, two types of cementitious control mixes were also considered; a Type K expansive cement and a Type I Portland cement were used in the control concrete and mortar mixtures.

According to ASTM C-845, mortar should be tested for restrained expansion (ASTM C-806), air content (ASTM C-231), time of set (ASTM C-403), and compressive strength (ASTM C-39). An expansive cement should satisfy the requirements in Table 1 in order to be suited for use in shrinkage compensating concrete.

TABLE 1

ASTM C-845 Physical Requirements for Expansive Cement Mortar

| | |
|---|---|
| Time of Setting, Min., Minutes | 75 |
| Air Content, Max., Vol % | 12.0 |
| Restrained expansion of mortar: | |
| 7-day expansion: | |
| Min., % | 0.04 |
| Max., % | 0.10 |
| 28-day percentage of 7 day expansion, maximum | 115 |
| Compressive Strength, min., | |
| 7-day psi (MPa) | 2100 (14.7) |
| 28-day psi (MPa) | 3500 (24.5) |

The 7-day and 28-day restrained expansions of mortar mixtures are presented in FIGS. 5 through 8. The control test data as well as the ASTM C-845 limits on restrained expansion are also presented in these Figures.

The test data presented suggest that the PPG-SB (PPG Solvent-Based) and PPG-WB (PPG Water-Based) at 1% by weight of cement satisfy the minimum 7-day and maximum 28-day limits on the restrained expansion of mortar as specified in ASTM C-845. However, since the 7-day measured expansions are rather close to the minimum limits, an increase in powder dosage from 1% to 1.5% was suggested.

The mortar set-time and air content test results, compared with the corresponding values of control mixtures and the ASTM C-845 limits, are shown in FIGS. 9 through 12. The paint sludge powder mixtures are observed to satisfy the ASTM limits on the set time and air content.

EXAMPLE 3

Figure 13:
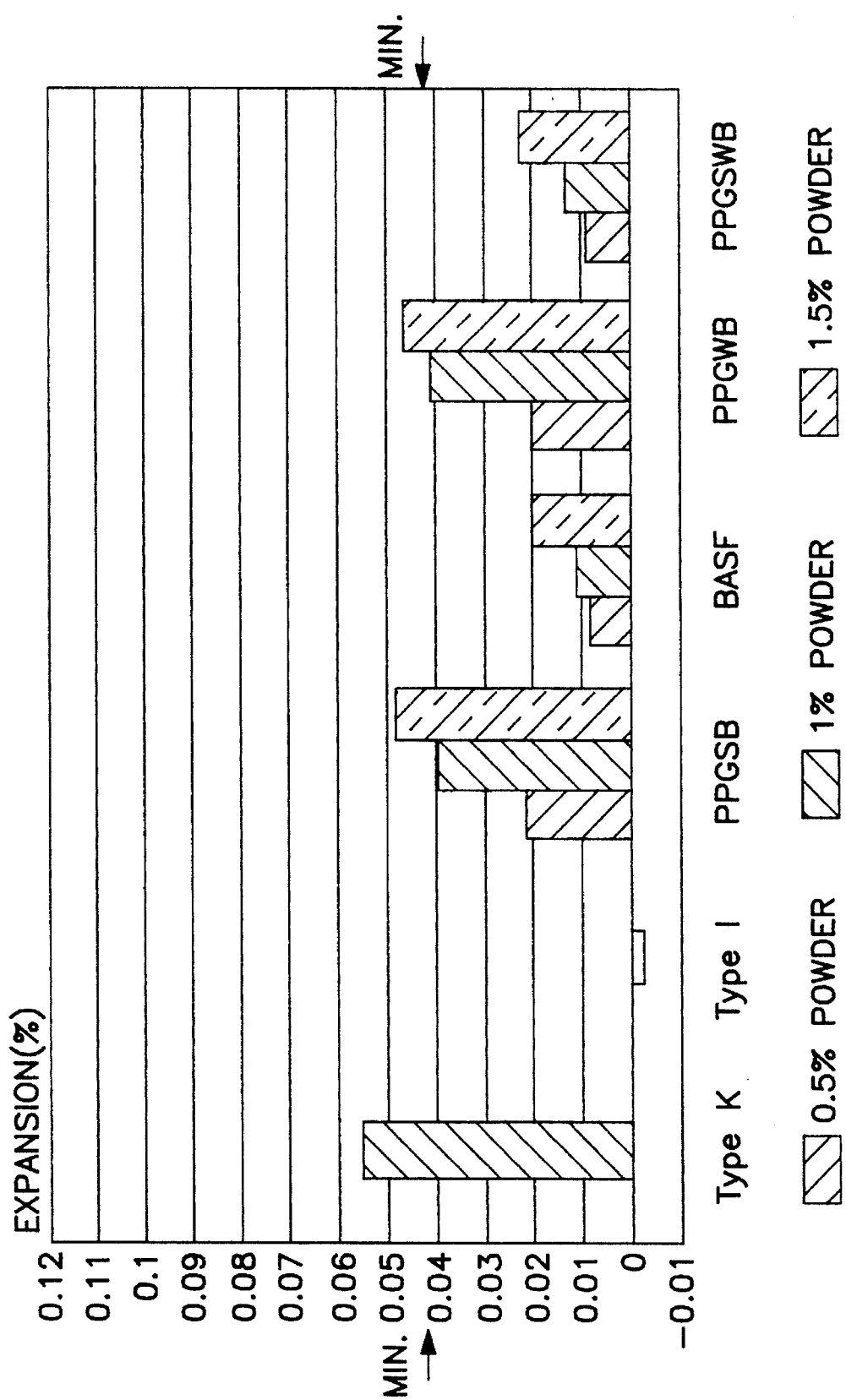
FIG. 13 is a graph showing the effects of powder content on 7 day expansion for various powders on a side-by-side basis.

Mortar specimens with 1% PPG-SB and PPG-WB satisfy the ASTM C-845 restrained expansion requirements as in Example 2; however, the expansion values were on the borderline. In order to reliably satisfy the restrained expansion requirements, mortar specimens with 1.5% powder content by weight of cement were prepared, and the resulting restrained expansions were compared with those obtained with lower powder contents. The results shown in FIG. 13 confirm that 1.5% addition of PPG-SB and PPG-WB leads to safe satisfaction of the minimum limit on 7-day restrained expansion.

EXAMPLE 4

A chemical analysis of the powders was conducted using Inductively Coupled-Atomic Emission Spectroscopy (ICAP) technique. The results shown in Table 2 indicate that the powders are rich in calcium compounds. This suggests that the expansion could be caused by either hydration of hard-burnt calcium oxide or the reaction of calcium carbonate with the cement alkali.

TABLE 2

Chemical Analysis of the Chrysler Paint Sludge Powders

| Chemical Contents | PPGSB | | BASF | | PPGWB Flint | PPGSWB Belvidere |
|---|---|---|---|---|---|---|
| | D-Truck | D-City | ST. Loius | Jeffers | B.C. | |
| B | 92.7 | <50.0 | 118 | <50.0 | 77.0 | <50.2 |
| S | 4530 | 1290 | 2040 | 4810 | 1520 | 1470 |
| Co | <2.49 | <5.0 | 32.5 | <5.0 | <2.49 | 13.6 |
| Mo | <9.98 | 161 | 13.0 | 20.7 | <9.96 | <10.0 |
| Sb | <25.0 | <50.0 | <25.0 | <50.0 | <24.9 | <25.1 |
| Hg | <25.0 | <50.0 | <25.0 | <50.0 | <24.9 | <25.1 |
| Na | 2870 | 666 | 1080 | 1290 | 2910 | <502 |
| Ba | 250 | 201 | 623 | 508 | 191 | 397 |
| Fe | 3860 | 3040 | 19400 | 4270 | 3850 | 11500 |
| P | 102 | 133 | 348 | 245 | 119 | 123 |
| As | <25.0 | <25.0 | 54.0 | <25.0 | <24.9 | <25.1 |
| Pb | <25.0 | <25.0 | <25.1 | <25.0 | <24.9 | <25.1 |
| K | 192 | 494 | 4980 | 424 | 220 | 1520 |
| Ca | 44000 | 40800 | 5780 | 20100 | 61500 | 2350 |
| Mg | 2190 | 858 | 2150 | 2630 | 2710 | 718 |
| Zn | 157 | 260 | 49.5 | 148 | 231 | 19.2 |
| Cr | 9.82 | <10.0 | 47.0 | 26.1 | 9.19 | 20.4 |
| Se | <200 | <200 | <200 | <200 | <199 | <201 |
| Ni | 29.7 | 23.7 | 53.9 | 55.2 | 26.7 | 24.8 |
| Cu | 778 | 619 | 88.7 | 486 | 688 | 33.0 |
| Mn | <2.49 | 18.7 | 106 | 76.7 | 78.9 | 70.1 |
| Al | 34100 | 20300 | 21900 | 34200 | 30700 | 8110 |
| Cd | <2.49 | <5.00 | <2.51 | <5.00 | <2.49 | <2.51 |
| Tl | <2.49 | <125 | <50.1 | <125 | <49.8 | <50.2 |

All values are in ppm

EXAMPLE 5

Figure 14:
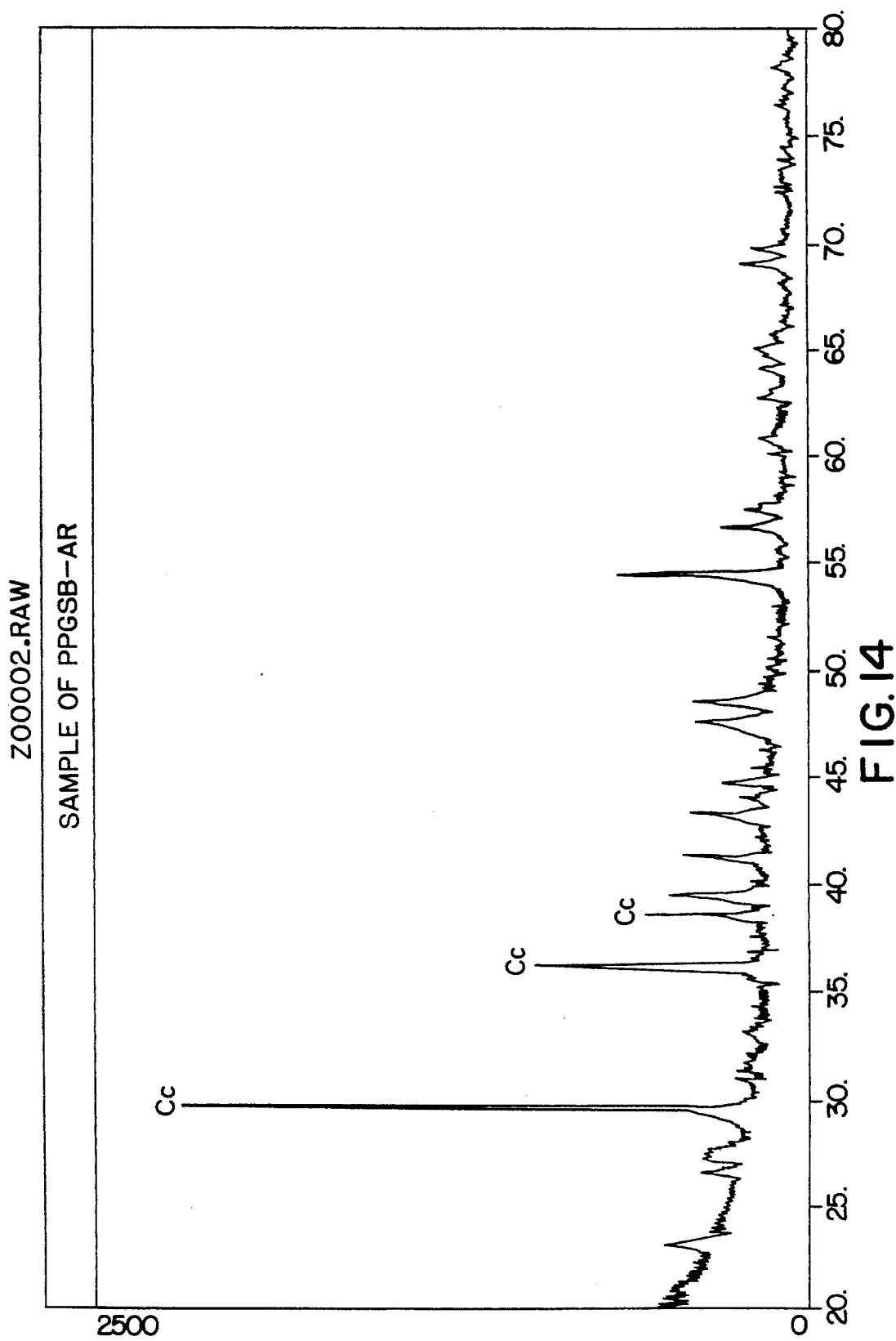
FIG. 14 is a graph showing x-ray diffraction (XRD) test results for PPG SB powder, where Cc is calcium carbonate.
Figure 15:
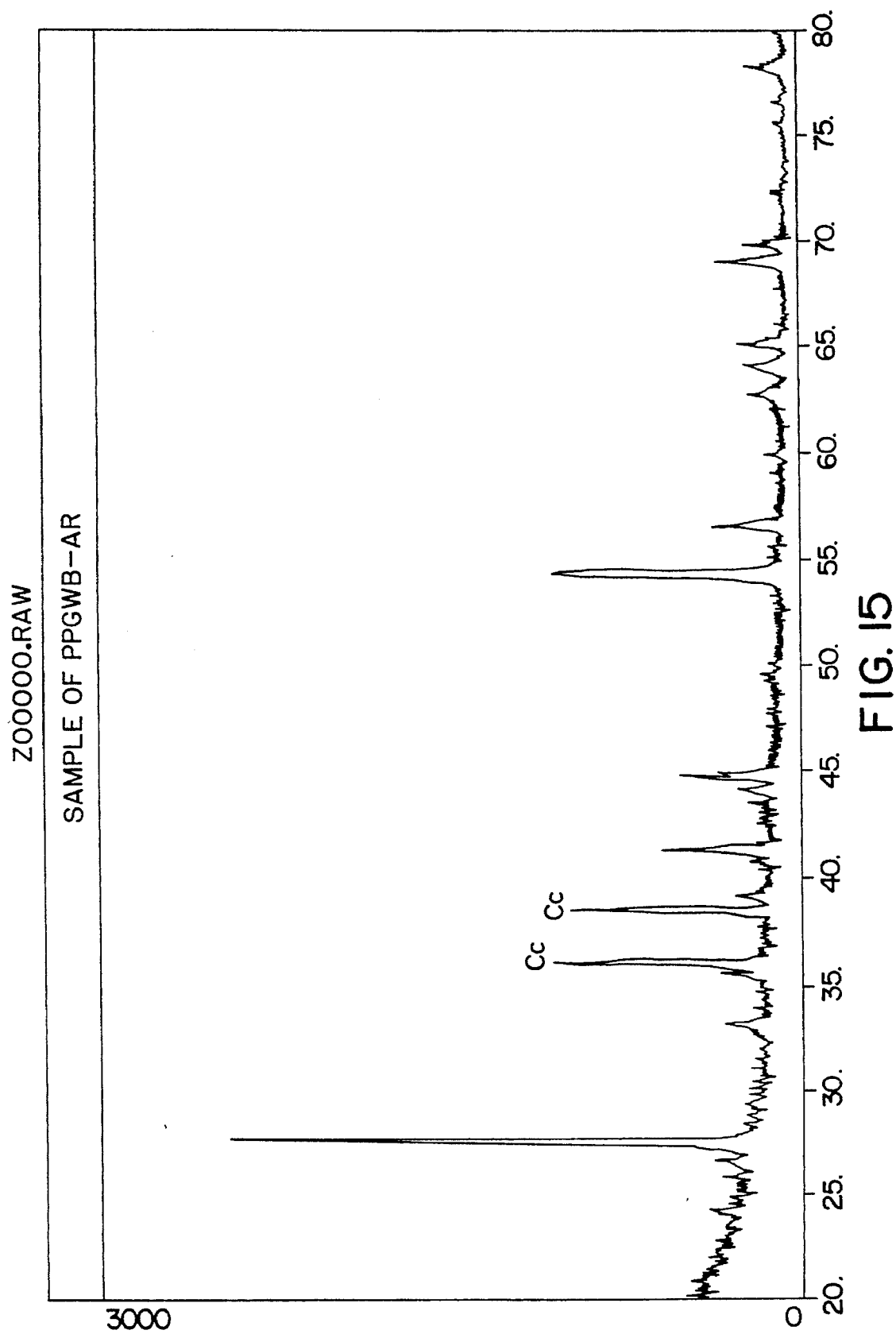
FIG. 15 is a graph showing XRD test results for PPG WB powder, wherein Cc is calcium carbonate.
Figure 16:
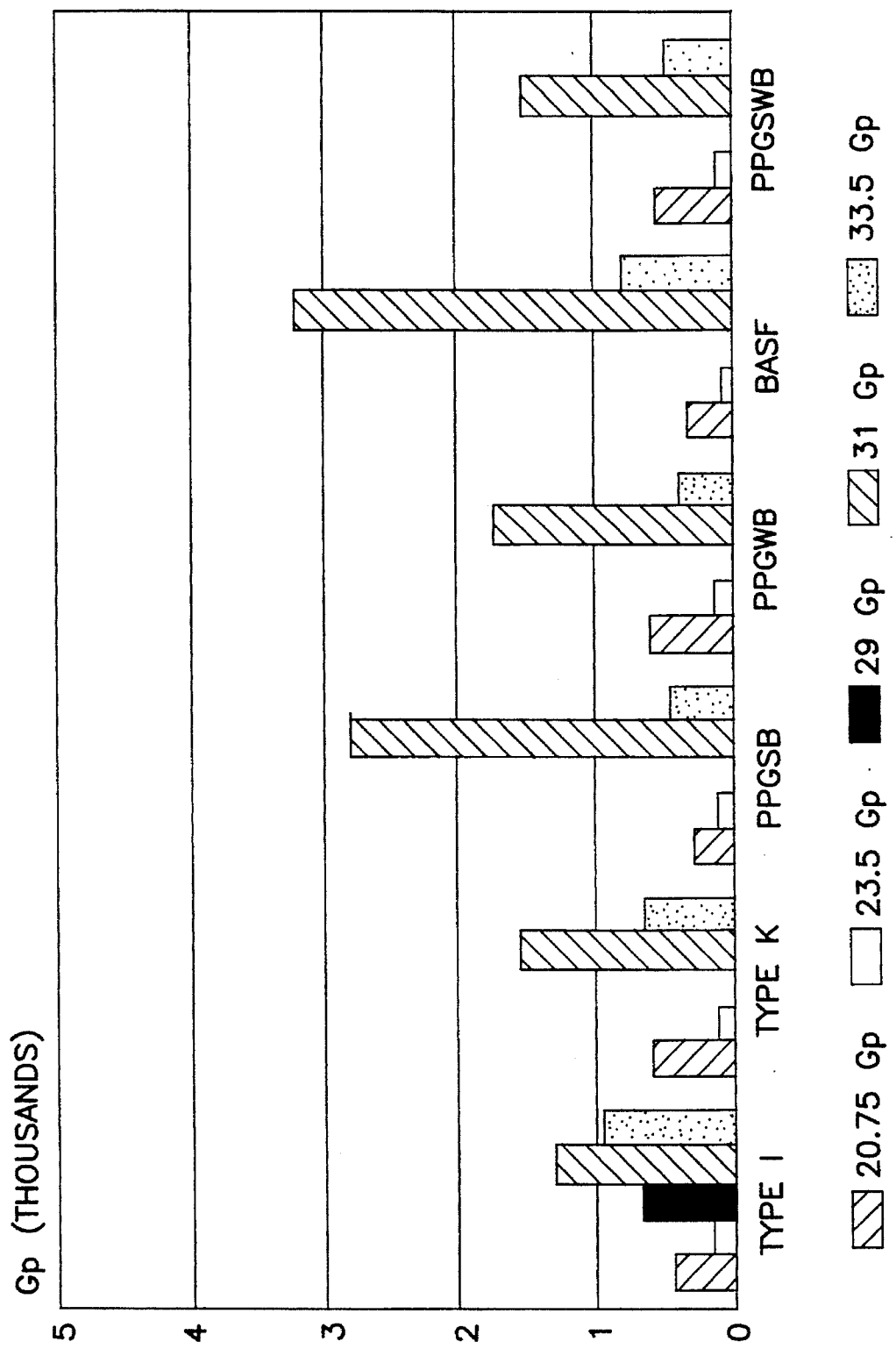
FIG. 16 is a graph showing an XRD analysis of gypsum (Gp, calcium sulfate) in the various paint powders.
Figure 17:
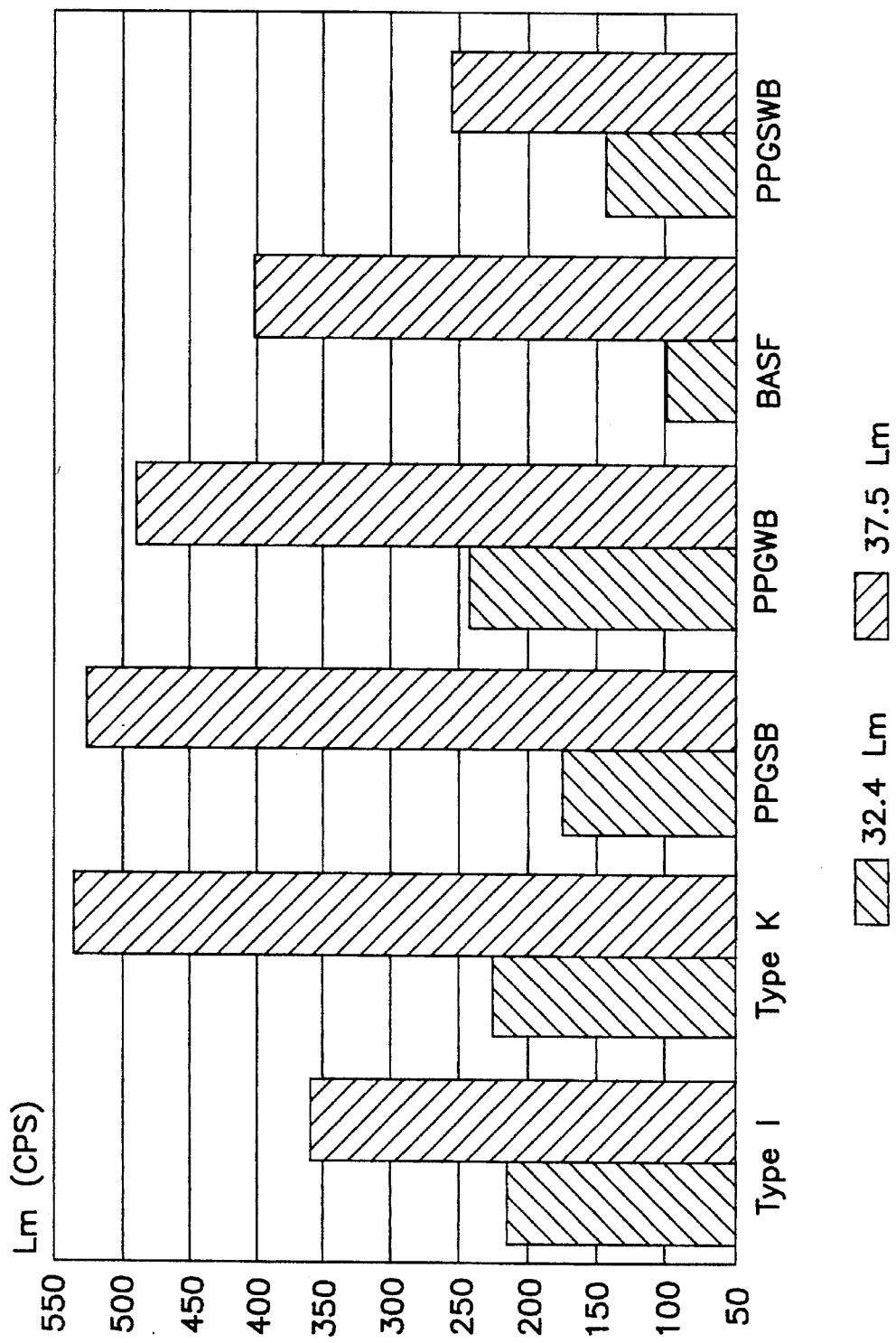
FIG. 17 is a graph showing an XRD analysis of lime (CaO) in the various paint powders.
Figure 18:
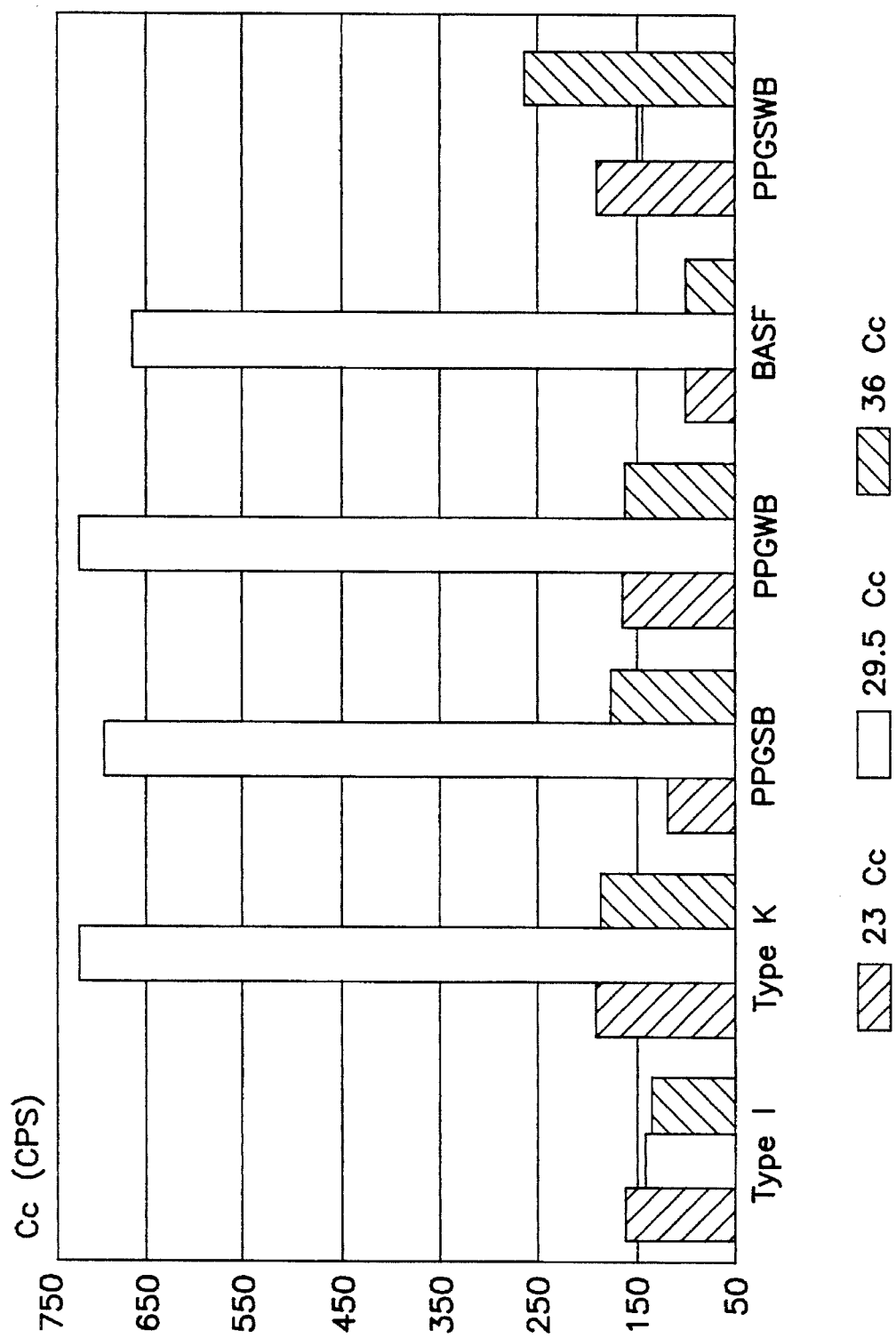
FIG. 18 is a graph showing an XRD analysis of calcium carbonate (calcite $CaCO_3$) in the various paint powders.
Figure 19:
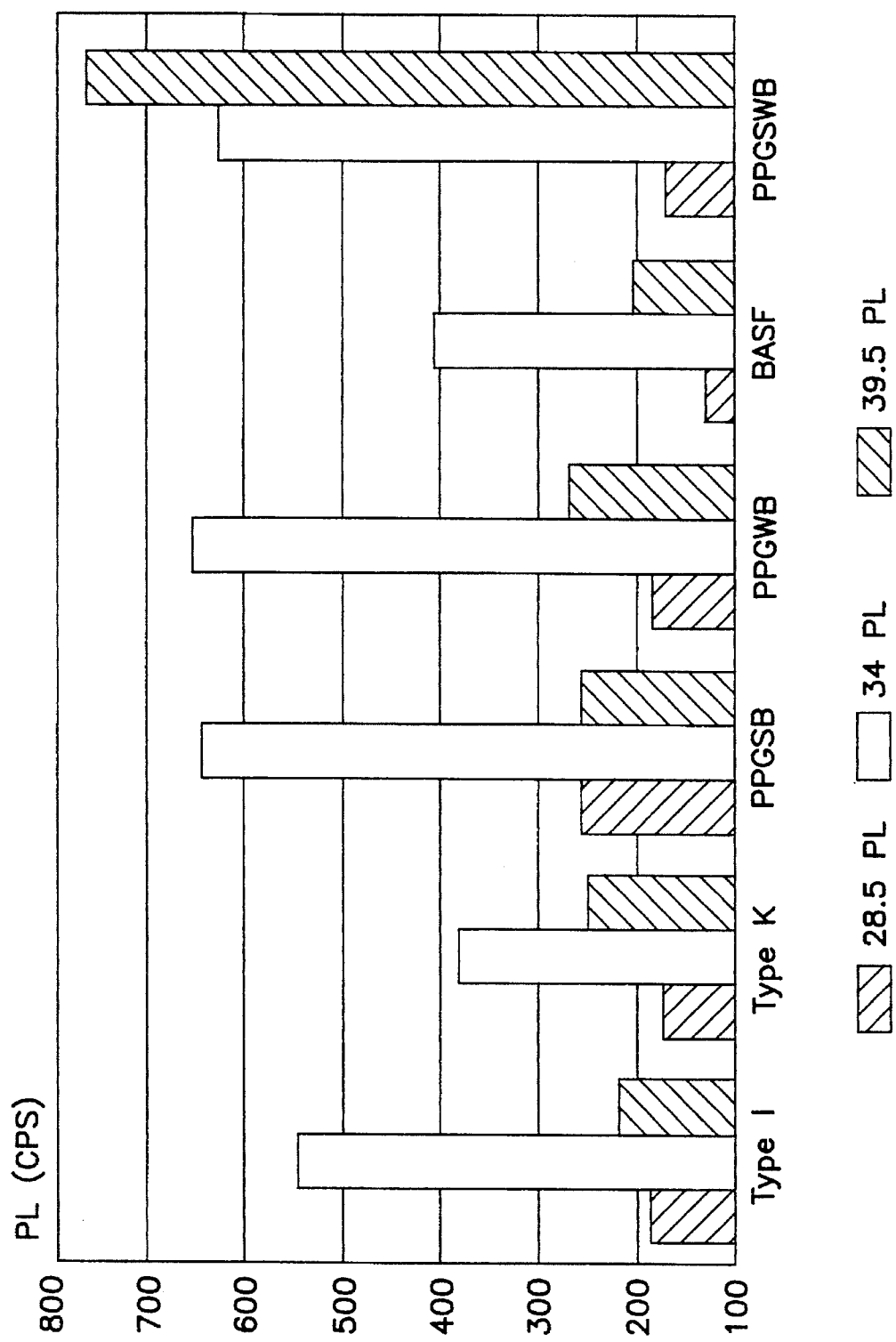
FIG. 19 is a graph showing an XRD analysis of calcium hydroxide (Portlandite; $Ca(OH)_2$) in the various paint powders.
Figure 20:
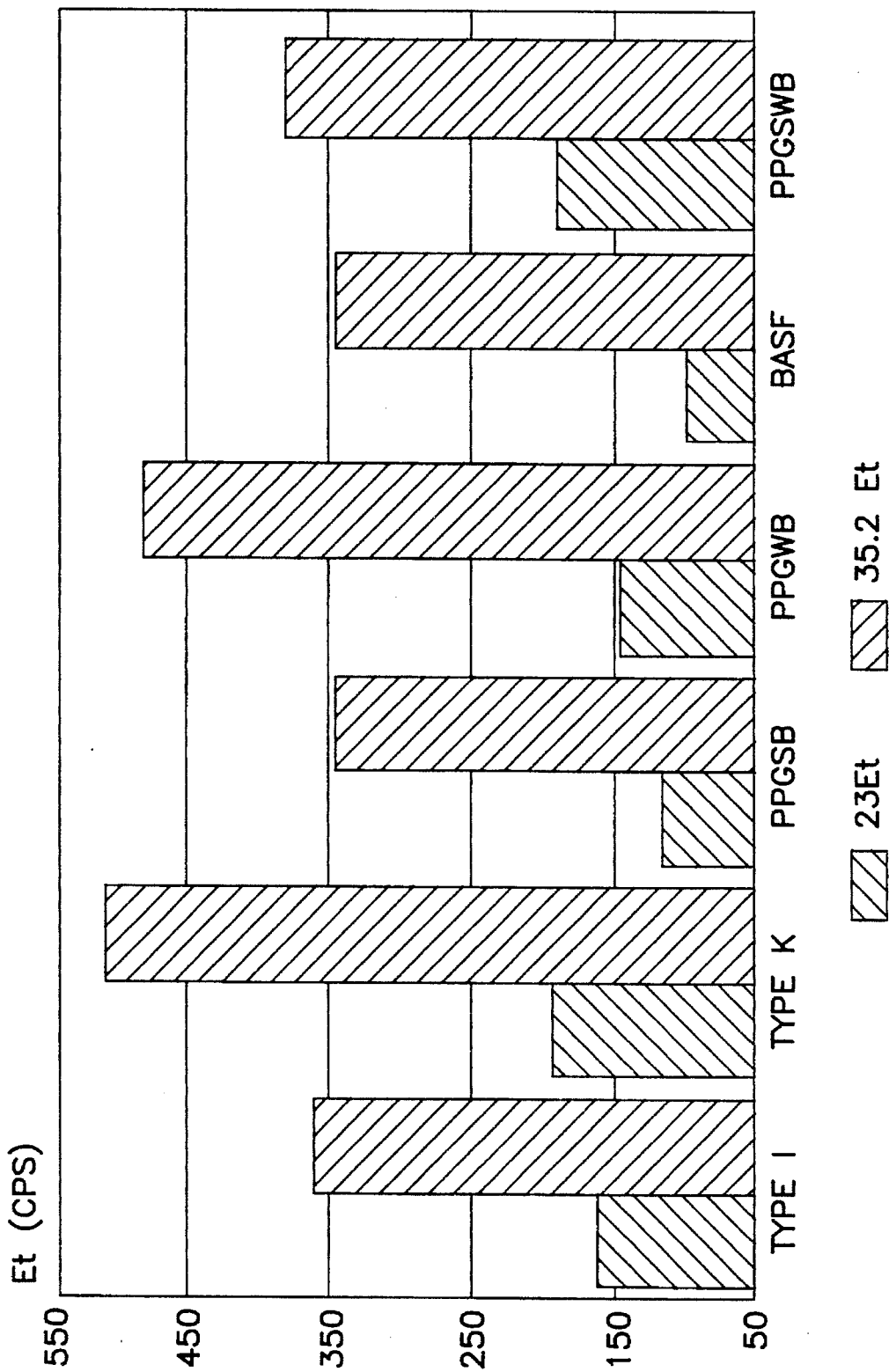
FIG. 20 is a graph showing an XRD analysis of ettringite in the various paint powders.
Figure 21:
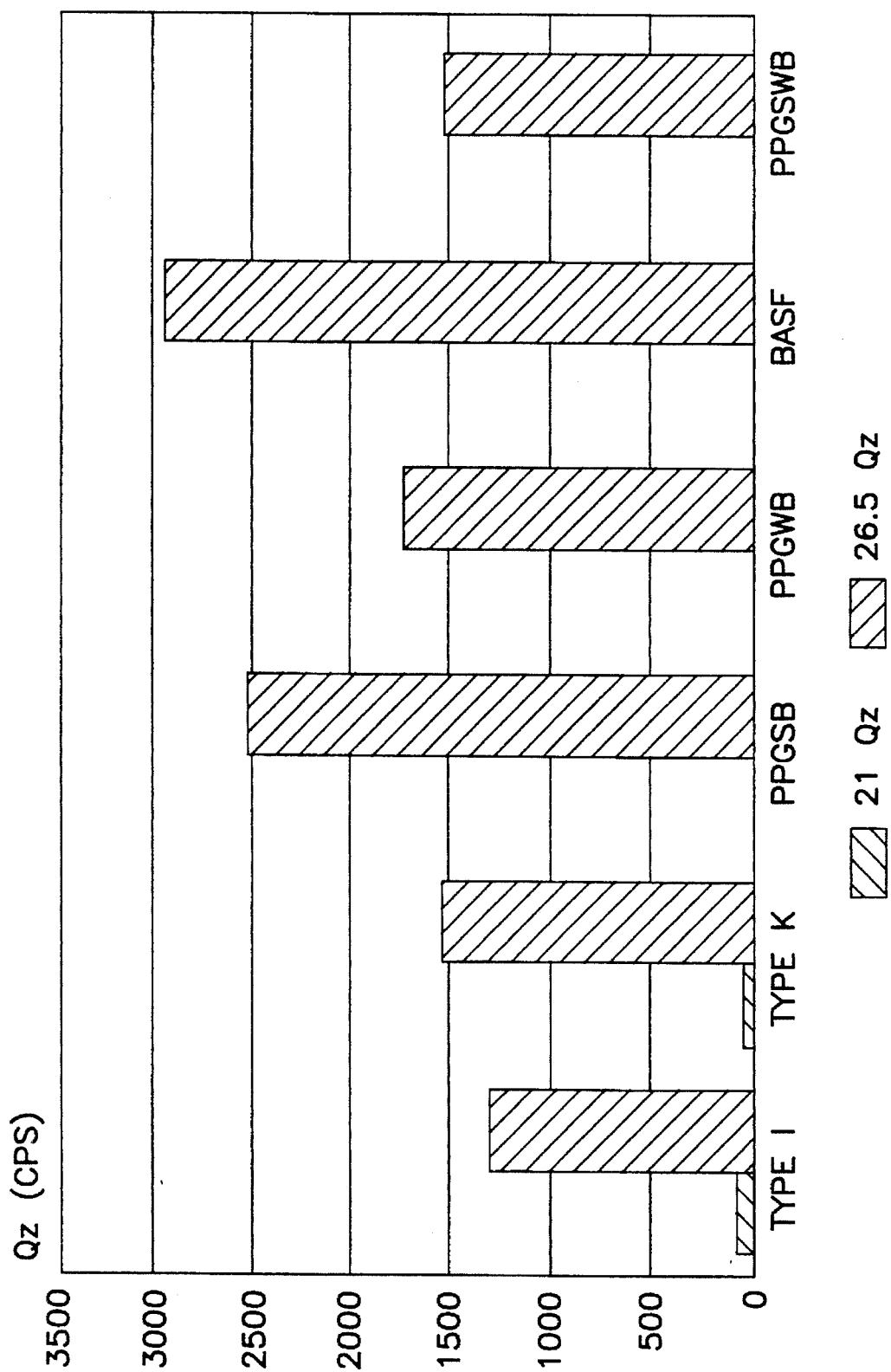
FIG. 21 is a graph showing an XRD analysis of quartz ($SiO_2$) in the various paint powders.
Figure 22:
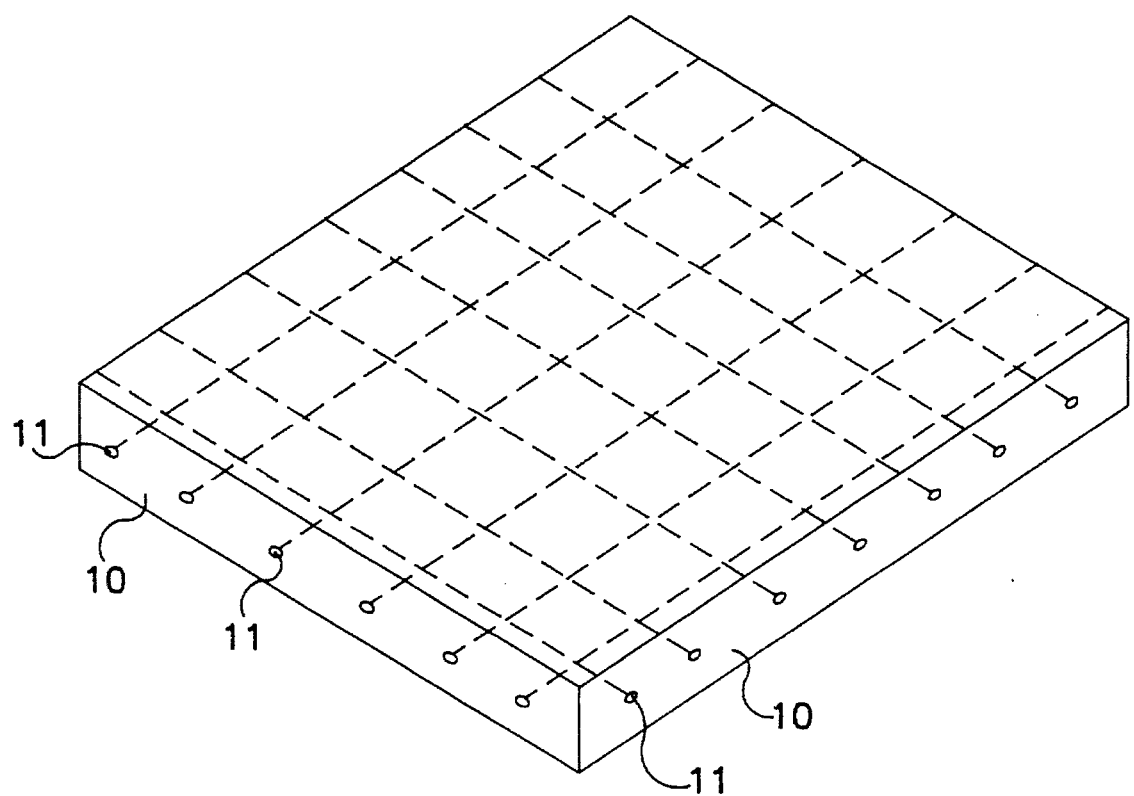
FIG. 22 is a schematic perspective view of a metal rod 11 reinforced concrete slab 10.

In order to determine the specific calcium compounds present in the powders, mineral analyses were conducted using X-Ray diffraction techniques. The results shown in FIGS. 14 and 15 suggest that the calcium is dominantly present in the form of calcium carbonate. This suggests that reaction of calcium carbonate with cement alkali (and not the hydration of hard-burnt calcium oxide) is possibly the dominant cause of expansion with paint sludge powders.

The X-ray diffraction test results were also generated for concretes incorporating the powders; Type I and Type K expansive concretes were used as a basis for comparison. Table 3 shows the codes and chemical formulas for the various compounds which can occur in the concrete.

TABLE 3

| Mineral Analog Name | Nominal Chemical Formula | Code |
|---|---|---|
| Lime | $CaO$ | Lm |
| Anhydrite | $CaSO_4$ | Ah |
| Hannebachite | $CaSO_3 \cdot \frac{1}{2}H_2O$ | Hb |
| Portlandite | $Ca(OH)_2$ | Pl |
| Gypsum | $CaSO_4 \cdot 2H_2O$ | Gp |
| Calcite | $CaCO_3$ | Cc |
| Quartz | $SiO_2$ | Qz |
| Hematite | $Fe_2O_3$ | Hm |
| Ettringite | $Ca_6Al_2(SO_4)_3(OH)_{12} \times 26H_2O$ | Et |
| Thaumasite | $Ca_6Si_2(SO_4)_2(CO_3)_2(OH)_{12} \cdot 24H_2O$ | Tm |

(a) Table 3 is from McCarthy, G. J., et al., "Mineralogical Analysis of Advanced Coal Conversion Residuals by X-Ray Diffraction" Proceedings, Tenth Ash Use Symposium, Report EPRS TN-101779, Electric Power Research Institute, pp. 58-1–58.14 (1993).

The X-ray diffraction results are shown in FIGS. 16 to 21 where CPS is counts per second. It was apparent that there are different calcium compounds present in concretes incorporating the paint sludge powders which can contribute to the expansion of the concrete.

The mechanism of reaction of the various compounds in the calcium compound containing process used in the present invention is unknown. The mechanism may involve a reaction with water and/or with other components of the Portland cement.

It is intended that the foregoing description be illustrative of the present invention and that the present invention be limited only by the hereinafter appended claims.

We claim:

1. A composition which hardens to form an expansive concrete when combined with water which comprises an admixture:
   (a) a powder of a Portland cement;
   (b) dried paint polymer powder particles selected to have a particle size between about 74 and 850 micrometers and to contain between about 0.001 and 1 parts by weight of an inorganic calcium material per part of the particles encapsulated in the particles which reacts with the cement when combined with the water to cause the concrete to expand, wherein the particles are dispersed in the cement in an amount between about 0.5 and 5 percent by weight of the cement, wherein the expansive concrete meets the requirements of ASTM C-845.

2. The product of claim 1 wherein the particles are a dried sludge resulting from overspray from spray painting a product.

3. The product of claim 1 wherein in addition the composition includes a particulate aggregate.

4. The product of claim 1 wherein the particles are derived from a paint sludge containing the calcium carbonate which has been dried.

5. The product of claim 4 wherein the sludge has been dried at a temperature between about 100° and 400° C. such that volatile materials in the sludge are removed and ground to provide the particles.

6. A reinforced expansive concrete which comprises:
   (a) a hardened Portland cement with reinforcing rods embedded in the hardened cement wherein the cement contains paint powder particles dispersed in the cement selected to have a particle size between about 74 and 850 micrometers and to contain between about 0.001 and 1 parts by weight of an inorganic calcium material per part of the particles encapsulated in the paint particles which reacts with the cement when combined with water to cause the concrete to expand, wherein the particles are dispersed in the cement in an amount between about 0.5 and 5 percent by weight of the cement, wherein the expansive concrete meets the requirements of ASTM C-845.

7. The concrete of claim 6 wherein the particles are a dried sludge resulting from overspray from spray painting a vehicle.

8. The concrete of claim 6 wherein in addition the composition includes a particulate aggregate.

9. The concrete of claim 6 wherein the particles are derived from a paint sludge containing the calcium carbonate which has been dried.

10. The concrete of claim 9 wherein the sludge has been dried at a temperature between about 100° and 400° C. such that volatile materials in the sludge are removed and ground to provide the particles.

11. In a method for preparing a reinforced expansive concrete by pouring a Portland cement composition around reinforcing rods which comprises:
   (a) mixing in the composition with water an effective amount of dried paint polymer powder particles which allows expansion of the concrete after hardening and containing an inorganic calcium material which reacts with the cement composition to cause the concrete to expand as a fluid concrete, wherein the particles are between 0.5 and 5 percent by weight of the cement, and are selected to have a particle size between 74 and 850 micrometers and to contain between about 0.001 and 1 part by weight of the calcium material per part of cement; and
   (b) pouring the fluid concrete containing the particles over the reinforcing rods inside a form for the concrete; and
   (c) allowing the fluid concrete to harden under moist conditions for at least seven days in the form to form a partially cured concrete that has expanded during the seven days; and
   (d) allowing the concrete to expand over a period of time to form the reinforced expansive concrete so that restraint of expansion by the reinforcing rod produces compression stresses in the expansive concrete which resist cracking of the concrete, wherein the expansive concrete meets the requirements of ASTM C-845.

12. The method of claim 11 wherein the particles are a dried sludge overspray resulting from spray painting of a vehicle.

13. The method of claim 11 wherein a particulate aggregate is added to the cement in step (a).

14. The method of claim 11 wherein the particles are derived from a paint sludge containing the calcium carbonate which has been dried.

15. The method of claim 14 wherein the sludge has been dried at a temperature between about 100° and 400° C. such that volatile materials in the sludge are removed and ground to provide the particles.

16. The method of any one of claims 11, 12, 13 or 14 wherein the reinforcing rods provide an open mesh.

17. In a method for preparing an expansive concrete by pouring a Portland cement composition such that expansion of the concrete is restrained, the improvement which comprises:

(a) mixing in the composition with water an effective amount which allows expansion of the concrete after hardening of dried paint polymer powder particles containing an inorganic calcium material which reacts with the cement combined with the water to cause the concrete to expand to provide a fluid concrete, wherein the particles are between 0.5 and 5 percent by weight of the cement, and are selected to have a particle size between 74 and 850 micrometers and to contain between about 0.001 and 1 part by weight of the calcium material per part of cement; and (b) pouring the fluid concrete containing the particles inside a form for the concrete such that expansion of the concrete is restrained; and (c) allowing the fluid concrete to harden under moist conditions with the restraint for about seven days or more to produce a partially cured concrete that has expanded; and (d) allowing the concrete to develop compression stressing through the restraint of expansion of the concrete which resist cracking of the concrete, wherein the expansive concrete meets the requirements of ASTM C-845.

* * * * *